US010216642B2

(12) United States Patent
Bybell et al.

(10) Patent No.: US 10,216,642 B2
(45) Date of Patent: Feb. 26, 2019

(54) HARDWARE-BASED PRE-PAGE WALK VIRTUAL ADDRESS TRANSFORMATION WHERE THE VIRTUAL ADDRESS IS SHIFTED BY CURRENT PAGE SIZE AND A MINIMUM PAGE SIZE

(71) Applicant: International Business Machines Corporation, Armonk, NY (US)

(72) Inventors: Anthony J. Bybell, Cedar Park, TX (US); Bradly G. Frey, Austin, TX (US); Michael Karl Gschwind, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 883 days.

(21) Appl. No.: 13/834,739

(22) Filed: Mar. 15, 2013

(65) Prior Publication Data

US 2014/0281353 A1    Sep. 18, 2014

(51) Int. Cl.
   *G06F 12/1009*    (2016.01)

(52) U.S. Cl.
   CPC .... *G06F 12/1009* (2013.01); *G06F 2212/652* (2013.01)

(58) Field of Classification Search
   None
   See application file for complete search history.

(56) References Cited

U.S. PATENT DOCUMENTS

| | | | | |
|---|---|---|---|---|
| 3,210,737 A | * | 10/1965 | Perry | G06F 5/012 327/185 |
| 3,691,531 A | * | 9/1972 | Saltini | G06F 5/017 712/205 |
| 4,680,700 A | * | 7/1987 | Hester et al. | 711/206 |
| 4,903,234 A | * | 2/1990 | Sakuraba | G06F 12/023 365/189.05 |
| 5,479,627 A | * | 12/1995 | Khalidi | G06F 12/1027 711/205 |
| 5,555,387 A | * | 9/1996 | Branstad et al. | 711/209 |
| 5,584,005 A | * | 12/1996 | Miyaoku | G06F 12/0292 711/206 |
| 6,012,132 A | * | 1/2000 | Yamada et al. | 711/207 |
| 6,393,544 B1 | * | 5/2002 | Bryg | G06F 12/1018 711/202 |
| 6,813,699 B1 | * | 11/2004 | Belgard | G06F 12/1036 711/203 |
| 2002/0133685 A1 | * | 9/2002 | Kalyanasundharam | 711/207 |
| 2003/0018876 A1 | * | 1/2003 | Zahir et al. | 711/206 |
| 2006/0067365 A1 | * | 3/2006 | Venkataramana et al. | 370/474 |
| 2006/0230223 A1 | * | 10/2006 | Kruger | G06F 12/1009 711/6 |
| 2012/0137105 A1 | | 5/2012 | Ahn | |

* cited by examiner

*Primary Examiner* — Ann J Lo
*Assistant Examiner* — Chie Yew
(74) *Attorney, Agent, or Firm* — DeLizio Law PLLC (57) ABSTRACT

An apparatus includes a processor and a virtual address transformation unit coupled with the processor. The virtual address transformation unit includes a register. The virtual address transformation unit is configured to receive an indication of a virtual address and read, from the register, a current page size of a plurality of available page sizes. The virtual address transformation unit is also configured to determine a shift amount based, at least in part, on the current page size and perform a bit shift of the virtual address, wherein the virtual address is bit shifted by, at least, the determined shift amount.

15 Claims, 5 Drawing Sheets

HARDWARE-BASED PRE-PAGE WALK VIRTUAL ADDRESS TRANSFORMATION WHERE THE VIRTUAL ADDRESS IS SHIFTED BY CURRENT PAGE SIZE AND A MINIMUM PAGE SIZE

BACKGROUND

Embodiments of the inventive subject matter generally relate to the field of computing systems, and, more particularly, to virtual memory.

Virtual memory allows computing systems to better manage memory than if the computing system was limited to managing the actual memory accessible by the computing system. For example, virtual memory functionality allows the computing system to allocate non-contiguous regions to a particular application, while giving the application the appearance of being allocated one contiguous region of memory. Additionally, virtual memory functionality allows a computing system to allocate more memory than is actually available in the computing system to applications. Whenever an application references a memory address on a system that implements virtual memory, the address is translated into a physical address that refers to the actual memory location. Because applications frequently interact with memory, inefficiency and inflexibility within the virtual memory system can cause performance degradation.

SUMMARY

Embodiments of the inventive subject matter generally include an apparatus. The apparatus includes a processor and a virtual address transformation unit coupled with the processor. The virtual address transformation unit includes a register. The virtual address transformation unit is configured to receive an indication of a virtual address. The virtual address transformation unit is also configured to read, from the register, a current page size of a plurality of available page sizes. The virtual address transformation unit is also configured to determine a shift amount based, at least in part, on the current page size. The virtual address transformation unit is also configured to perform a bit shift of the virtual address, wherein the virtual address is bit shifted by, at least, the determined shift amount.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes example systems, methods, techniques, instruction sequences and computer program products that embody techniques of the present inventive subject matter. However, it is understood that the described embodiments may be practiced without these specific details. For instance, although examples refer to 64-bit memory architectures, the inventive subject matter can be implemented on memory architectures utilizing any size memory addresses. In other instances, well-known instruction instances, protocols, structures and techniques have not been shown in detail in order not to obfuscate the description.

Computing systems are generally implemented such that the smallest unit of memory that can be allocated to an application is a "page." The size of a page can vary between implementations. For example, while a four kilobyte (4 KB) page is common, a page can be defined as any size. Additionally, some implementations allow selectable page sizes, such as allowing a 4 KB "small" page and a 64 KB "large page." Although not allowing smaller sized regions of memory to be allocated can result in memory fragmentation, the design of a memory architecture utilizing pages can result in increased efficiency that offsets the memory fragmentation.

Virtual memory allows computing systems to more efficiently allocate memory. Each application or process (hereinafter "application") is associated with a virtual address space. The virtual address space appears, to the application, as a contiguous set of memory. A page table maps the pages of the virtual address space to pages in the physical memory, which may not be contiguous. Virtual memory also allows the computing system to provide more memory to the application than is actually available in the system. For example, in a system that has 4 GB of random access memory (RAM) installed, multiple applications can be allocated 4 GB or more of virtual memory. This is possible because most applications do not actively use all available memory at once, allowing the computing system to "page out" inactive regions to other storage, such as hard disks.

In some embodiments, a computing system can include multiple page tables, such as one for each application. The computing system can include configuration data that indicates where the page table for a particular application is located in memory, allowing the computing system to reference the proper page table depending on which application is currently being executed. At the most basic, a page table contains page table entries that map virtual memory pages to physical memory pages. Page tables can also include metadata about the individual pages, such as what process the page belongs to, whether the page is designated as read-only, etc. Page tables can also be implemented in a variety of ways, such as inverted page tables, hashed page tables, radix page tables, etc.

When an instruction associated with an application references a virtual memory address (hereinafter "virtual address"), the computing system translates the virtual address to a physical memory address (hereinafter "physical address"). The techniques used to translate the virtual address to a physical address vary between implementations. For example, in the basic page table described above, the computing system searches for the virtual address in the page table (referred to as a "page table walk"). Upon finding the virtual address, the computing system reads the physical address associated with the page table entry. Other page table implementations can be more complex. For example, a hashed page table can include using a hash function to generate a hash of the virtual address, an index lookup using the hashed value, and a page table walk of an inverted page table using the index value.

Virtual addresses can be broken up into multiple components. For example, a virtual address can be defined to include a page identifier and a page offset. The page offset specifies the specific byte within the page that is being accessed, whereas the page identifier specifies which page the byte is located in. Thus, when doing a page table walk, the page identifier portion of the virtual address can be used to find the page table entry. The page offset would then be concatenated with the physical address in the page table entry to get the complete physical address.

Due to the potential size of a virtual address space, a page table can get very large. Page tables can be broken up into more manageable sizes by using a multilevel page table. For example, if the memory architecture is designed to work most efficiently with 4 KB page sizes, the page table can be designed to have multiple, hierarchical levels of 4 KBs. Each page table entry is a reference to another page table in the hierarchy, until the last level, which references the physical address. In such implementations, the page identifier portion of a virtual address can be further defined to include sub-identifiers that correspond to particular levels of the page table.

Page tables can be implemented to support multiple page sizes. This is facilitated by having the page table managed by the operating system. Because the operating system is software, more flexibility is afforded to it than a hardware implementation. For example, as the page size increases, the page offset portion of the virtual address increases in size while the page identifier portion becomes smaller. Software is better adapted to handle such variations. Additionally, in a multilevel page table, fewer levels are used when the page size increases. Thus, the transformation of the virtual address into a form used by the page walk mechanism can change depending on the page size. However, each operation performed by the operating system increases the amount of time used to translate the virtual address to a physical address. Performing one or more of the operations in hardware can increase the efficiency of the memory architecture.

Thus, the memory architecture of a computing system can be designed to transform a virtual address based on the configured page size prior to the page walk using hardware. This reduces the number of operations performed in software, thus increasing the efficiency of the translation process. Further, if the page table walk mechanism functions independently of the page size, the complexity of the software is reduced while increasing compatibility.

Figure 1:
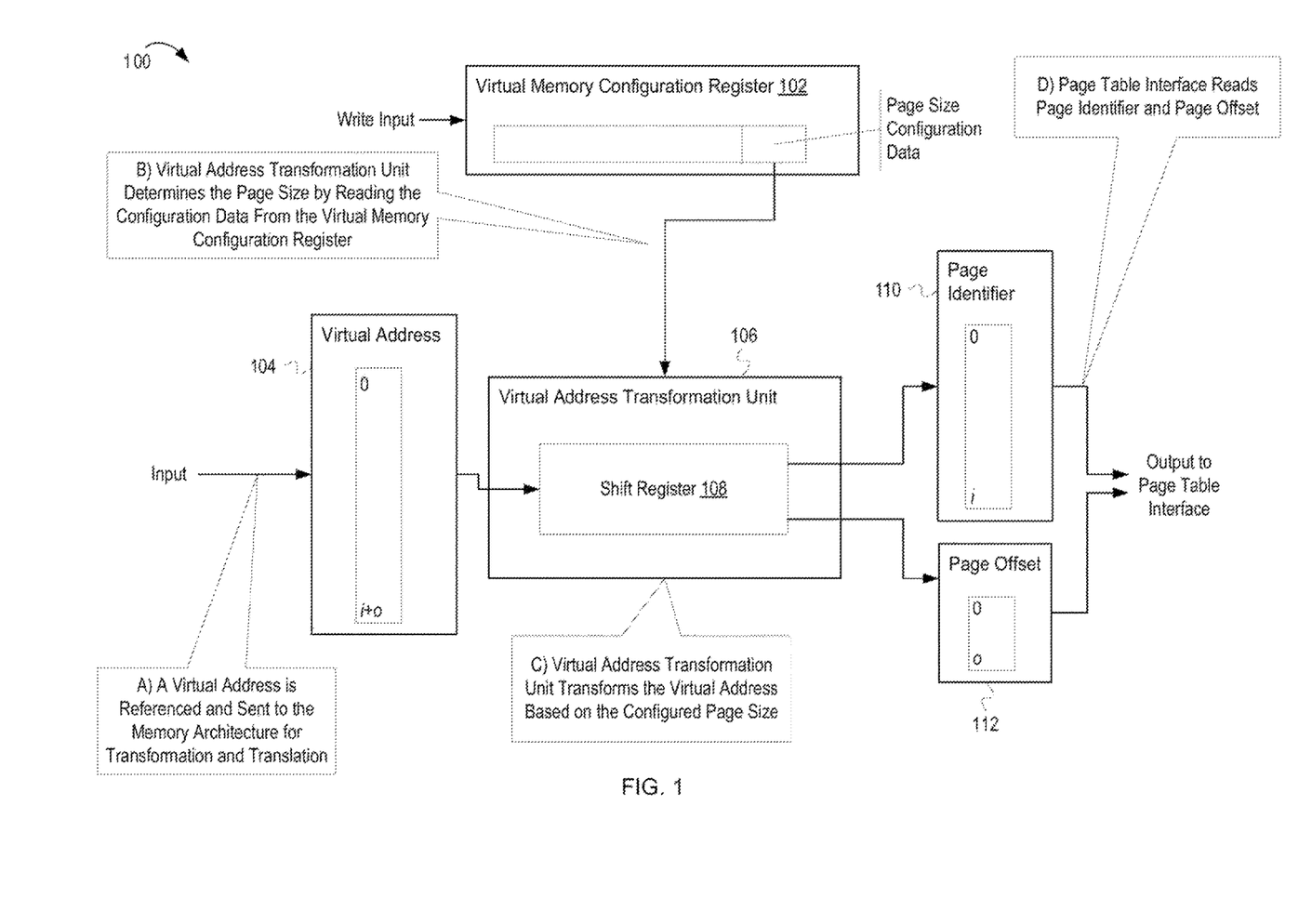
FIG. 1 depicts the components and operations of a processor that supports hardware-based virtual address transformation and dynamic page sizing.

FIG. 1 depicts the components and operations of a processor that supports hardware-based virtual address transformation and dynamic page sizing. FIG. 1 depicts a subset of a processor 100, including a virtual memory configuration register 102 and a virtual address transformation unit 106. The virtual address transformation unit 106 includes a shift register 108. FIG. 1 also depicts a virtual address 104, a page identifier 110 and a page offset 112.

It should be noted that the descriptions herein exclude some low level details that have only minor impacts on implementations. For example, some examples may refer to 64-bit memory addresses, but this is just for illustration and the inventive subject matter can apply to any size memory address. It is also assumed that the memory architecture is byte-addressable, but the inventive subject matter can apply even in implementations that are not byte-addressable.

At stage A, a virtual address 104 is referenced and sent to the memory architecture for transformation and translation. The memory architecture generally exists as a component on the processor, but can also exist as a separate component or combined with other components. The virtual address 104 is received by the virtual address transformation unit (hereinafter "transformation unit") 106. A virtual address 104 can be referenced by various components and processes within a processor. For example, a load instruction can reference a virtual address 104. If the data located at the virtual address 104 is not also located in the cache, the processor fetches the data from memory. To fetch the data from memory, the processor sends the virtual address 104 to the memory architecture, which translates the virtual address 104 into a physical address. A processor can also perform context switches, in which one process or thread running on the processor is exchanged for another process or thread. During a context switch, the processor may store the state of the process or thread that is being idled to memory, and thus may reference the virtual addresses associated with the process or thread data.

The size of the virtual address 104 can vary between architectures. For example, a 32-bit architecture would generally have a maximum virtual address size of 32-bits, while a 64-bit architecture would generally have a maximum virtual address size of 64-bits. Architectures can also further restrict the size of the virtual address 104 for purposes such as including bits representing metadata. Various ranges of bits in the virtual address 104 can serve different functions as well. As described above, the virtual address 104 can include a set of bits representing the page identifier and a set of bits representing the page offset. In some embodiments, as depicted here, the virtual address 104 is defined as having a length of i plus o bits, where i is the number of bits representing a page identifier and o is the number of bits representing the page offset. In the embodiment depicted in FIG. 1, o low order bits of the virtual address 104 represent the page offset 112, while the remaining i bits represent the page identifier 110. The specific number of bits in the virtual address 104 that represent the page offset 112 and page identifier 110 will vary based on the current page size, as described below.

At stage B, the transformation unit 106 reads configuration data from the virtual memory configuration register (hereinafter "configuration register") 102. The configuration data can include various settings such as the memory address for the first level of the page table and the page size. The transformation unit 106 determines the page size based on the data stored in the configuration register 102. The technique used to determine the page size can vary between implementations. For example, the transformation unit 106 may utilize bit masking and bit shifting to isolate the specific bits representing the page size, or may read only the specific bits that represent the page size.

The page size can be stored in the configuration register 102 in various ways. For example, the page size can be stored as the number of bits to shift the virtual address 104 (described in more detail in relation to stage C). The page size can also be stored as a value that is associated with a specific page size. For example, 0b000 may represent 4 KB page sizes, 0b001 may represent 8 KB page sizes, 0b010 may represent 16 KB page sizes, etc.

The configuration register 102 includes at least one write input that allows one or more components to write a value to the configuration register 102. For example, the operating system can be allowed to change the values in the configuration register 102 by writing to the configuration register 102. The operating system can also be restricted to writing only certain parts of the configuration register 102. The processor may write to the configuration register 102 when switching processes or threads in order to change the address of the first level of the page table.

The configuration register 102 is one representation of many possible implementations for the maintaining of the configuration data. Some other variations include storing each configuration setting in individual registers instead of combining them into one, storing the configuration settings in other storage mechanisms (such as latches), storing the configuration settings in system memory, etc. Thus the inventive subject matter is not limited to embodiments with a configuration register as depicted above.

At stage C, the transformation unit 106 transforms the virtual address 104 based on the configured page size. The technique(s) used to transform the virtual address 104 can vary between implementations based on many factors, such as the design and implementation of the memory architecture and the desired layout of the memory address. For example, some bits available for the virtual address 104 can instead be used for metadata. Metadata bits may be removed using a variety of techniques, such as bit shifting or bit masking, during the transformation of the virtual address 104.

As described above at stage A, o low order bits of the virtual address 104 represent the page offset 112 and the remaining i bits represent the page identifier 110. The page identifier 110 is used to identify the memory page in which the data resides, while the page offset 112 refers to the specific byte within the memory page that contains the data. However, if the page size changes, the number of bits representing the page identifier 110 and the number of bits representing the page offset 112 changes. For example, 4 KB pages include 4096 individual bytes, meaning the page offset 112 is represented by twelve bits. In other words, if the page size is 4 KB, o is twelve. The remaining bits of a 64-bit memory address, or fifty two bits, represent the page identifier 110. However, if the page size is 64 KB, each page includes 65536 bytes. To represent 65536 bytes, the page offset 112, and o, is sixteen bits.

In order to provide the system component that walks the page table with the appropriate page identifier 110 and page offset 112, the transformation unit 106 is implemented to isolate the page identifier 110 from the page offset 112 (as well as any other bits, such as metadata bits) based on the page size. With virtual addresses defined as in the depicted embodiment, a shift register 108 can be used to transform the virtual address 104. The shift register 108 is implemented such that it shifts the virtual address 104 by an amount specified by the page size configuration data stored in the configuration register 102. As detailed in reference to stage B, the page size configuration data can be stored in different ways. For example, as detailed above, the shift register 108 can be implemented to shift the virtual address 104 by one bit for each bit in the page size configuration data that is set to one. Thus, if the page offset 112 is twelve bits, the page size configuration data would be set to a value that includes twelve bits set to one.

As also detailed above, the page size configuration data can also be stored as individual values that are associated with specific page sizes. For example, 0b000 may represent 4 KB page sizes, 0b001 may represent 8 KB page sizes, 0b010 may represent 16 KB page sizes, etc. The actual implementation can vary. In implementations where the page sizes increase by powers of two, as just described, the shift register can be implemented to shift the virtual address 104 by a set base amount plus an extra amount corresponding to the page size configuration data. For example, if 0b000 represents 4 KB page sizes, the shift register 108 can be implemented to always shift the virtual address 104 by a minimum of twelve bits. The shift register 108 then additionally shifts by the number of bits represented by the page size configuration data. If the page size configuration data is set to 0b000, which represents the value zero, no additional shifting is done, resulting in a shift of twelve bits. If the page size configuration data is set to 0b001, which represents the value one, the virtual address is shifted by one additional bit, resulting in a shift of thirteen bits. In implementations where the page size configuration data corresponds to arbitrary values, a mapping table or other similar mechanism can be implemented to translate the value stored in the page size configuration data to the appropriate number of bits to shift.

The bits that are shifted out of the virtual address 104 represent the page offset 112. The shift register 108 can be implemented in various ways. For example, the shift register can include a barrel shifter and a register designated to store the page offset. The shift register 108 can also include a shifter with a parallel input and a serial output, the serial output being connected to a register with a serial input. As bits are shifted out of the virtual address 104, the bits are transmitted to the register via the serial input. The page offset can then be read from the register in the shift register 108 implementation. Because the page offset is variable size, the transformation unit 106 can pad the page offset portion of the output with zeros as appropriate. Furthermore, the shift register 108 can be implemented to either zero fill the most significant bits as the least significant bits are shifted off or implemented to maintain a sign bit. For example, if the virtual address 104 is a signed value, the shift register 108 can maintain the proper sign by propagating copies of the sign bit.

The transformation of the virtual address 104 is independent of the particular page table type. Thus, the transformation unit 106 transforms the virtual address 104 into a format that is compatible with the various page table types that are supported by the computing system. In other words, the page table type, and thus the page walk technique, is not dependent on the current page size, allowing the computing system to select any of a plurality of page sizes and any of a plurality of page table types, irrespective of each other. This can allow for all permutations of page size and page table types to be selected, depending on the specific implementation. The particular page table walk technique can be viewed as accepting a virtual address (or page identifier and/or page offset) as an input. As long as the provided input fits a particular defined template, the page table walker can utilize the virtual address, regardless of the particular page size and technique used to transform the original virtual address.

After the virtual address 104 is transformed, the page identifier 110 and the page offset 112 have been isolated from each other. The page identifier 110 consists of i bits, while the page offset 112 consists of o bits. In some implementations, the page identifier 110 and the page offset 112 can be recombined into a single register, allowing the page table interface to read the values from a single location.

At stage D, the page table interface reads the page identifier 110 and the page offset 112. The transformation of the virtual address 104 into a page identifier 110 and page offset 112 is transparent to the page table interface. As described above, various bits in the page identifier 110 can be used to reference different levels of the page table. For example, assume a computer architecture defines 4 KB pages as the smallest page size. Further assume that the virtual address 104 is 64-bits, but sixteen bits are not used for the actual address. If the page table size was set to 4 KB, the resulting page offset 112 would contain twelve bits, while the page identifier 110 would contain thirty-six bits.

The page identifier 110 could further be defined as containing four sets of nine bits, with each set corresponding to a level in the page table.

The page table interface is any component that consumes the page identifier and page offset, or any combination of components that consumes the page identifier and/or the page offset. The specific component can vary between implementations. For example, in some embodiments, the page table interface can be a component that performs additional transformation and/or translation to the page identifier and/or page offset. In some embodiments, the page table interface is the component that performs the page table walk. Additionally, the page table interface can be software, hardware or a combination thereof.

Figure 2:
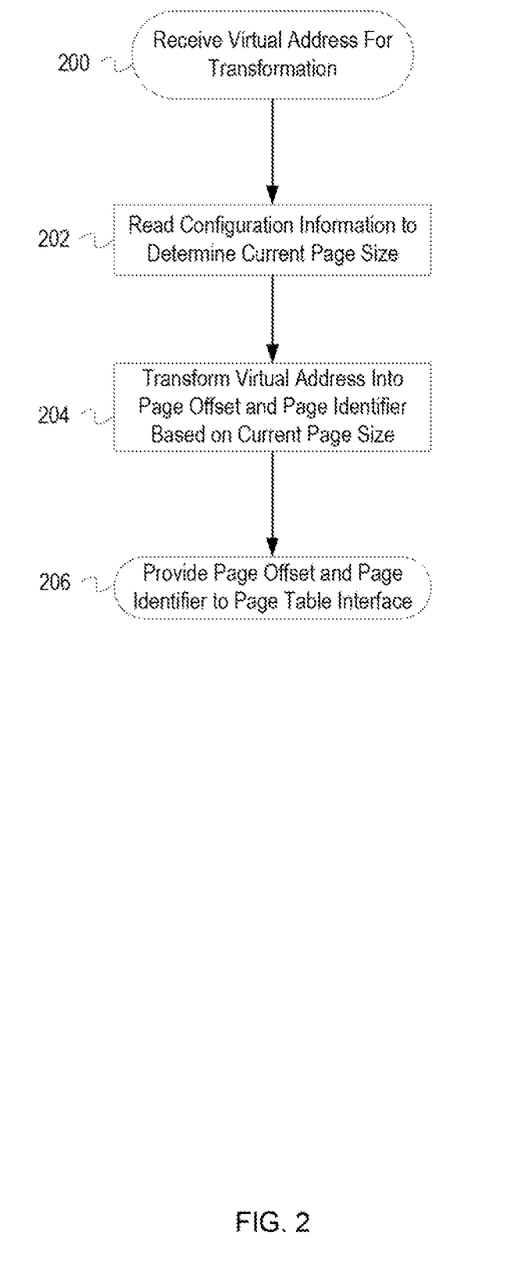
FIG. 2 depicts a flowchart of example operations for implementing a virtual address transformation unit.

FIG. 2 depicts a flowchart of example operations for implementing a virtual address transformation unit.

At block 200, the transformation unit receives the virtual address. The actual implementation of how the transformation unit receives the virtual address can vary. For example, another component may write the virtual address to an input of the transformation unit. Or, another component may write the virtual address to a particular register, while also notifying the transformation unit that the virtual address was written to the register. The transformation unit can then read the virtual address from the register. After the transformation unit receives the virtual address, control then flows to block 202.

At block 202, the transformation unit reads the configuration information to determine the current page size. As described above, the page size can be stored in a variety of forms, including as part of several different data elements stored in a single register or stored in a register dedicated solely to the page size configuration data. Thus, the technique used to read the configuration information can vary between implementations, and can include reading a value from a register, reading a value from a register then masking and/or bit shifting the value, performing a partial read of a register, interacting with another component, such as the system memory or operating system, etc. After reading the configuration information and determining the page size, control then flows to block 204.

At block 204, the transformation unit transforms the virtual address based on the current page size. The transformation performed by the transformation unit can vary between implementations. As described above, the transformation unit can be implemented to shift the bits of the virtual address to obtain a page offset and page identifier. The transformation unit can also be implemented to pad one or both of the page offset and page identifier values, reverse the values, mask out certain bits and transform the virtual address into additional components beyond the page offset and page identifier. After transforming the virtual address, control then flows to block 206.

At block 206, the transformation unit provides the page offset and page identifier to the page table interface. Similar to receiving the virtual address, the techniques used to provide the page offset and page identifier to the page table interface can vary. For example, the page offset and page identifier can be written to inputs of the page table interface. The page offset and page identifier can be stored in one or more registers in the transformation unit, which the page table interface can read from after being notified by the transformation unit that the values are ready to be read.

Figure 3:
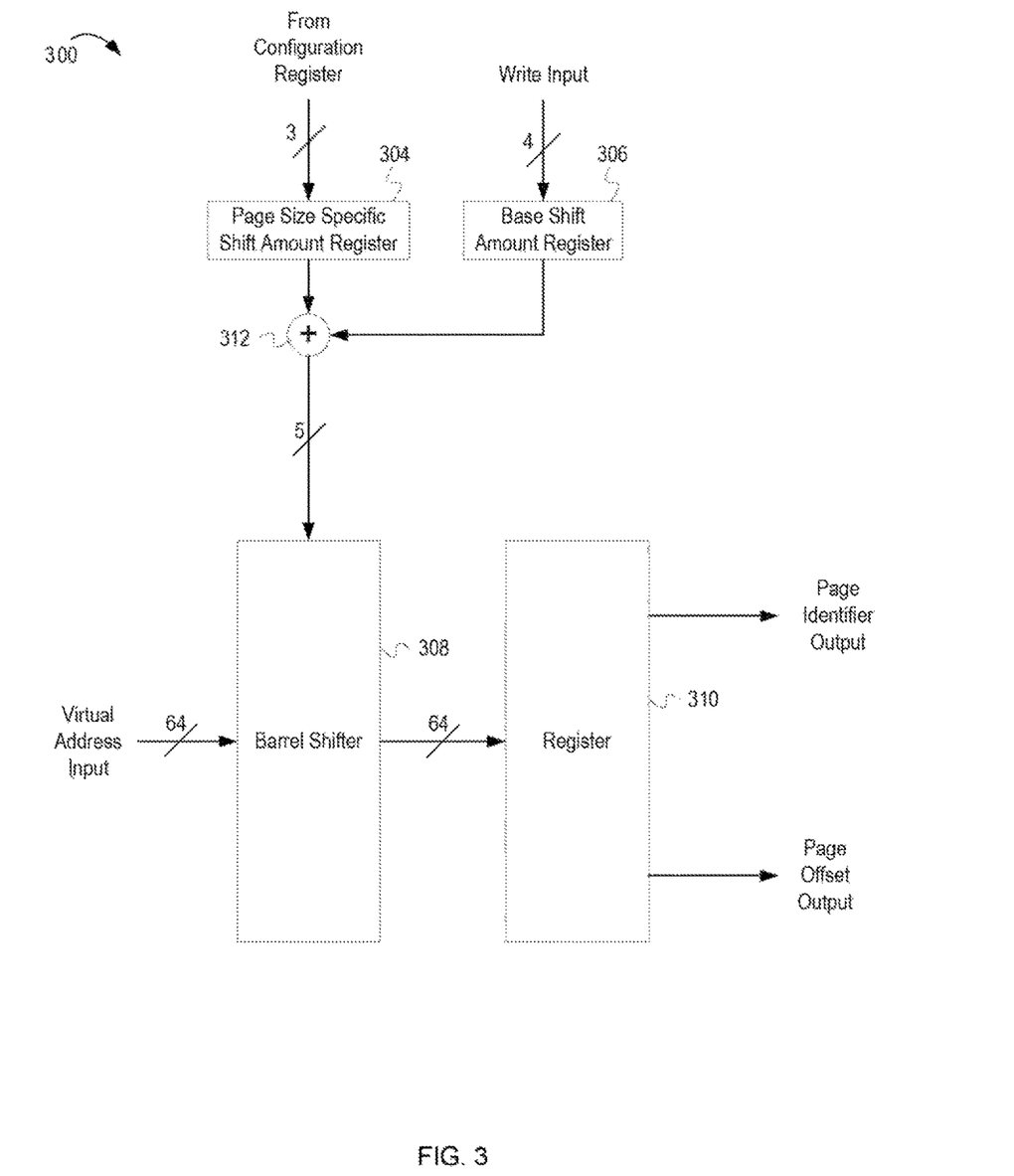
FIG. 3 depicts the components of an embodiment of a shift register-based transformation unit.

FIG. 3 depicts the components of an embodiment of a shift register-based transformation unit. FIG. 3 depicts a transformation unit 300, including a page size specific shift amount register 304 and a base shift amount register 306. The transformation unit 300 also includes a barrel shifter 308, a register 310 and an adder 312. The barrel shifter 308 and register 310 can constitute the shift register 108 depicted in FIG. 1.

The transformation unit 300 is depicted above as reading the configuration data from the configuration register. However, in some embodiments, the transformation unit 300 does not explicitly read the data from the configuration register. Instead, any time the data changes in the configuration register, the updated configuration data is written to the page size specific shift amount register 304. Some embodiments utilize a base shift amount. In such embodiments, the base shift amount can be stored in a register, such as the base shift amount register 306. This allows additional flexibility when the page size increments are not powers of two. For example, as described above, if in a particular implementation the minimum page size is 4 KB and each successive page size is double the previous page size, the base shift amount register can be set to be twelve. Then, the value representing each page size is added to the base shift amount to determine the number of bits to shift the virtual address. If the minimum page size is 4 KB, which is represented by 0b000, and the next page size is 16 KB, represented by 0b001, the previous technique will not work. However, if the page size is configured to be 16 KB, the value thirteen can be written to the base shift amount register 306, thus accomplishing the appropriate fourteen bit shift.

The barrel shifter 308 includes multiple levels of multiplexors. The outputs of each level are connected to the inputs of the next level in a manner that allows for each level to either shift the output from the previous level by an additional power of two or pass the output straight through to the next level without shifting. Thus, if the barrel shifter 308 has five levels, the maximum shift amount is thirty one bits, while six levels allows a maximum shift amount of sixty three bits. The specific number of barrel shifter 308 levels will vary between implementations based on the maximum shift value. For example, if the maximum page offset is less than thirty two bits, a five level barrel shifter 308 is sufficient. The output from the adder 312 activates the various levels of the barrel shifter by selecting the shift or pass-through multiplexor input, with the low order bit activating the first level, next highest order bit activating the second level, etc. The barrel shifter 308 allows for constant-time bit shifts, thus any value written to the barrel shifter 308 inputs is shifted by the current shift amount and output to the register 310.

The shifted value is written into the register 310. The transformation unit 300 can pad the values as appropriate either as part of the shifting process or output of the values from the register 310. The register 310 can include two outputs as depicted, with one output corresponding to the bits associated with the page offset and the other output corresponding to the bits associated with the page identifier. The register 310 can also include a single output, in which case the reading component is responsible for separating the page identifier and page offset values. Other implementation variations are possible. For example, the register 310 can instead be two individual registers, or the register 310 can be excluded, thus writing the shifted value to the input of any connected component. The actual bit width of the page identifier output and page offset output would be implemented to allow for the maximum number of bits to be sent based on the smallest and largest page table size. For example, if the smallest page table size was 4 KB, the page identifier output would be 52-bits wide in a 64-bit architecture. If the largest page table size was 64 KB, the page offset output would be 16-bits wide.

Figure 4:
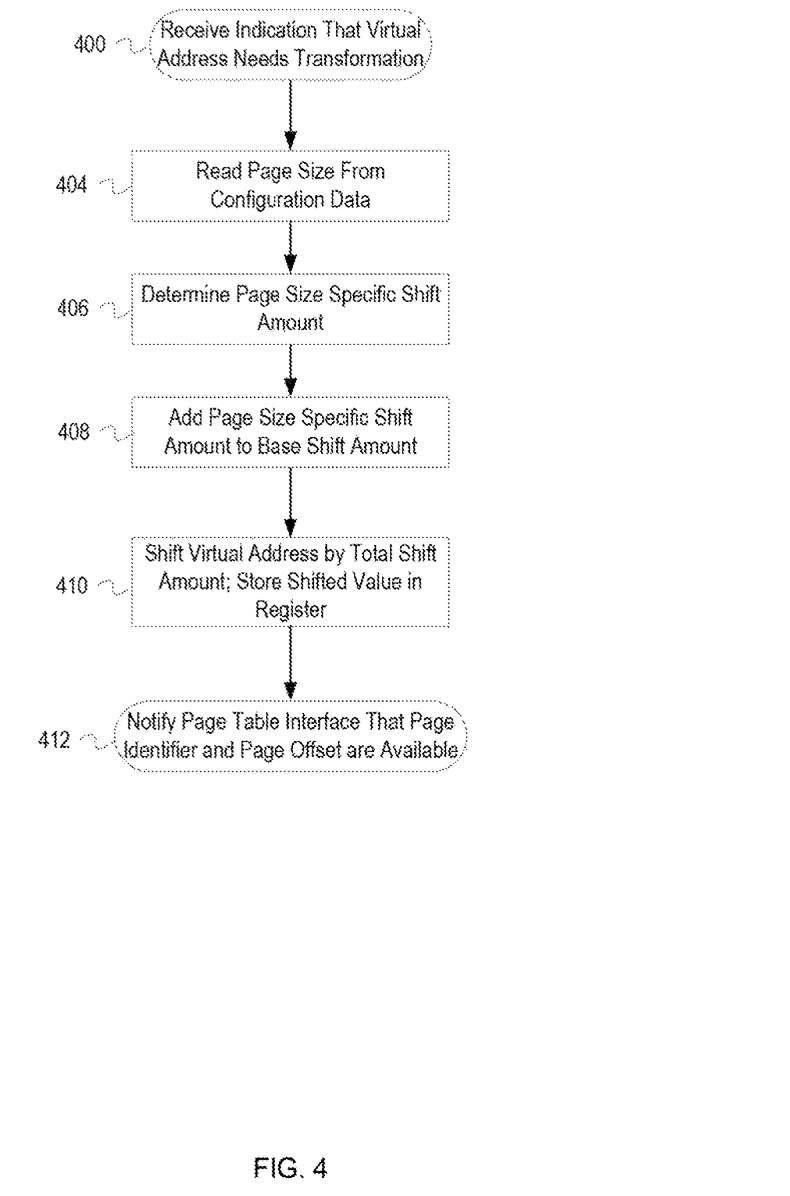
FIG. 4 depicts a flowchart of example operations for implementing a transformation unit using a barrel shifter.

FIG. 4 depicts a flowchart of example operations for implementing a transformation unit using a barrel shifter.

At block 400, the transformation unit receives an indication that a virtual address needs transformation. Depending on the implementation, it can be possible that multiple virtual addresses need transformation at the same time or the transformation process takes multiple processor cycles. A queue can be implemented to hold multiple virtual addresses that need to be transformed. Regardless of the specific implementation, the storage mechanism for virtual addresses that need to be transformed can notify the transformation unit when a virtual address is stored therein. Alternatively, the transformation unit can set a bit in the storage mechanism, indicating that the currently stored address has been read. When a new virtual address is written to the storage mechanism, the indicator bit is flipped. The transformation unit can check the indicator bit periodically, such as each cycle the transformation unit is not operating on a virtual address. After receiving the indication that the virtual address needs transformation, control then flows to block 404.

At block 404, the page size is read from the configuration data. As described above, the configuration data can be stored in a variety of ways, so the implementation can vary accordingly. For example, in some embodiments, the read may be a read of a register that stores the configuration data or a partial read of a register that contains the data for multiple configuration values. Additionally, the page size may not be actively read, but may be written anytime the configuration changes. After reading the page size from the configuration data, control then flows to block 406.

At block 406, page size specific shift amount is determined. The page size specific shift amount is the shift amount that is added to the base shift amount to determine the total shift amount. As described above, this can be accomplished in a variety of ways. For example, a mapping table can be utilized if there is little relationship between the configuration value representing the page size and the shift amount. If there is a relationship between the configuration value representing the page size and the shift amount, the page size specific shift amount can be calculated based on the configuration value by utilizing the relationship. After the page size specific shift amount is determined, control then flows to block 408.

At block 408, the page size specific shift amount is added to the base shift amount to calculate the total shift amount. The base shift amount can be the shift amount for the smallest page size, or can be adjusted based on the configured page size, as described above. After calculating the total shift amount, control then flows to block 410.

At block 410, the virtual address is shifted by the total shift amount and the shifted value is stored in a register. Because a barrel shifter shifts the input value in constant-time, the transformation unit can prevent the value from reaching the input of the barrel shifter to prevent the overwriting of a value in the register. The register can also include a write input, which is activated to write a value to the register. Instead of controlling the input into the barrel shifter, the transformation unit can then control whether the register is writable or not to prevent the overwriting of a value stored in the register. As described above, the shifting of the virtual address can be implemented to preserve the sign of the original virtual address, or can merely pad zeros as appropriate. After shifting the virtual address by the total shift amount and the shifted value is stored in the register, control then flows to block 412.

At block 412, the transformation unit notifies the page table interface that a page identifier and page offset are available for translation into a physical address. The technique used to notify the page table interface can vary between implementations. For example, the transformation unit can write the page identifier and page offset to specified registers. Or, the transformation unit can set a specific bit to a defined value, indicating that the page table interface can read the value from the transformation unit. After notifying the page table interface that the page identifier and page offset are available for translation, the process ends.

Memory can also be divided into segments as well. A segment is a block of memory comprising a set of pages. Thus, each segment has its own page table. Different segments can have different page sizes. The configuration data can include a value pointing to the base memory address for the page table associated with the currently active segment of memory. The configuration data also includes the page size specific to the currently active segment of memory, in accordance with the descriptions above.

The page sizes described above may include minimum page sizes for a particular page table or set of page tables. For example, if the minimum configured page size is 4 KB, the memory architecture can be implemented to allow for page sizes that are combinations of 4 KB pages. For example, tree-based page tables, such as a radix page table, can support multiple page sizes in the same page table. A particular branch with larger page sizes uses fewer levels than branches with smaller page sizes. Metadata associated with the page table entry can indicate whether the physical address associated with the page table entry is a pointer to another level of the page table or the physical address of the actual data referenced by the virtual address.

In some embodiments, the transformation unit reads the current page size from a storage description register. The storage description register can also include other metadata, such as the physical address of the current page table and the size of the current segment. The storage description register is updated to modify the page size, segment size and physical address of the page table as appropriate. For example, the physical address of a page table associated with a first process will generally differ from that of the physical address of a page table associated with a second process. Thus, when a context switch is performed, the physical address of the page table is generally updated.

The transformation unit receives a virtual address in the form of a segment page number with a page offset (also known as a "byte offset") concatenated to it. The segment page number is the page identifier for the particular memory segment that is active. The transformation unit determines the size (number of bits) of the page offset based on the current page size stored in the storage description register. The size of the page offset can also be determined based on the segment size. The transformation unit then utilizes a shift register to perform a right bit shift, right shifting the virtual address a number of bits equal to the size of the page offset. The result of the bit shift is a normalized page number and the page offset as two separate values. The normalized page number is then provided to a radix table walker, which utilizes the normalized page number to walk a radix page table. The radix table walker finds the associated physical address for the physical page the data is located in. The page offset is then concatenated to the physical page address by the table walker or another component to generate a physical address associated with the data referenced by the virtual address.

Although the embodiments described above describe using a shift register, the inventive subject matter is not so limited. The actual implementation of a virtual address transformation unit can vary based on the implementation of the page table. For example, the transformation unit can be implemented to isolate the individual sub-identifiers for multilevel page tables instead of only isolating the entire set. The transformation unit can also be implemented to perform different operations on the virtual address based on metadata bits in the virtual address itself or the related configuration data. For example, the high order bit of a virtual address can be defined to indicate whether a virtual address includes metadata bits or not. In other words, if the virtual address high order bit is set to one, the virtual address contains ten bits of metadata, whereas if the high order bit is set to zero, the virtual address contains zero bits of metadata. The transformation unit can be implemented such that if the high order bit is set to one, the metadata bits are not included in the page identifier.

As example flowcharts, the flowcharts depicted above present operations in an example order from which embodiments can deviate (e.g., operations can be performed in a different order than illustrated and/or in parallel). For example, instead of reading the page size configuration data after writing the virtual address into the shift register as depicted in FIG. 4 at blocks 404 and 402, respectively, the transformation unit can read the page size configuration data first.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, infrared, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 5:
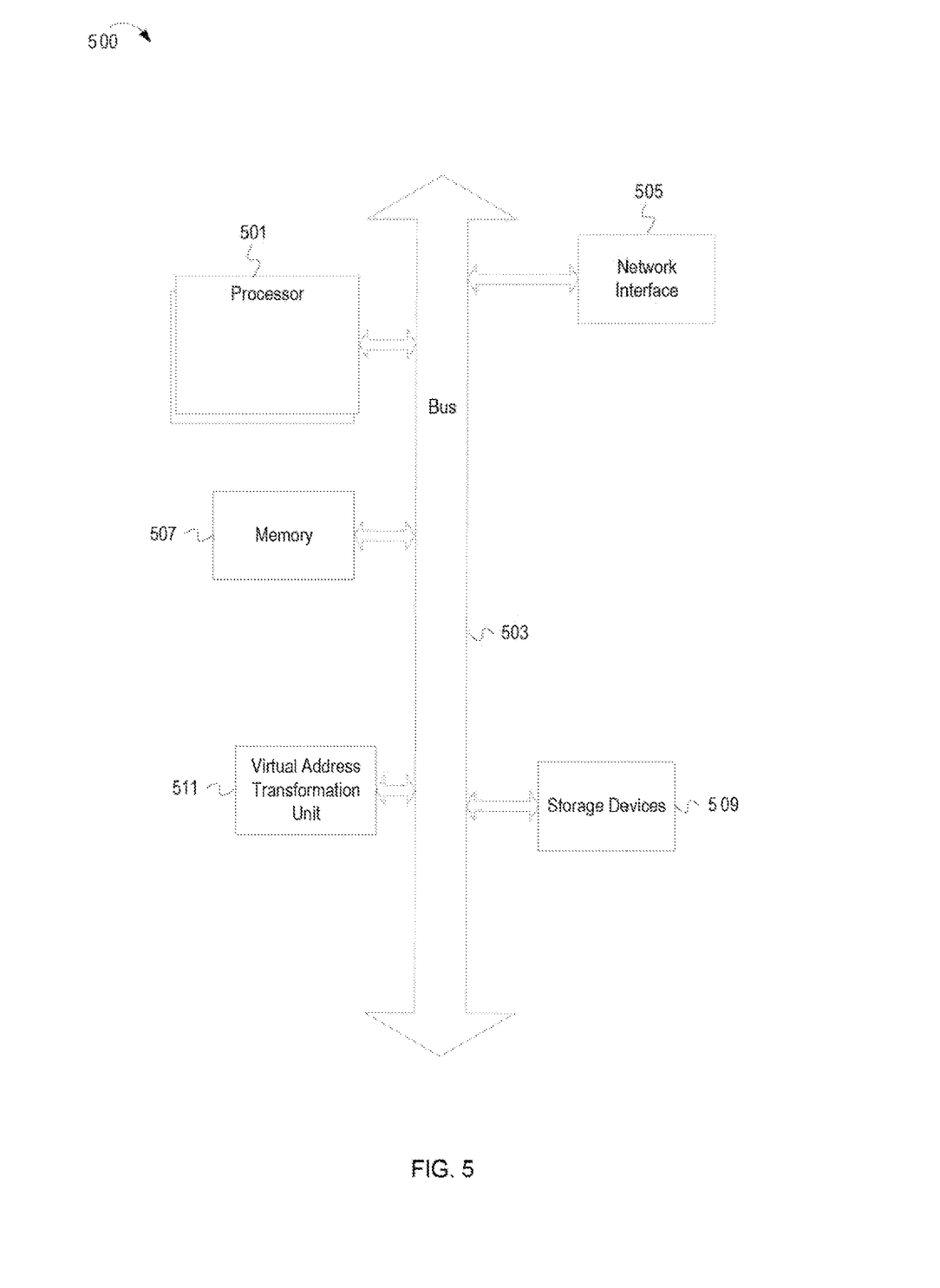
FIG. 5 depicts an example computer system including a virtual address transformation unit.

FIG. 5 depicts an example computer system including a virtual address transformation unit. A computer system includes a processor unit 501 (possibly including multiple processors, multiple cores, multiple nodes, and/or implementing multi-threading, etc.). The computer system includes memory 507. The memory 507 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 503 (e.g., PCI, ISA, PCI-Express, HyperTransport®, InfiniBand®, NuBus, etc.), a network interface 505 (e.g., an ATM interface, an Ethernet interface, a Frame Relay interface, SONET interface, wireless interface, etc.), and a storage device(s) 509 (e.g., optical storage, magnetic storage, etc.). The computer system also includes a virtual address transformation unit 511. The virtual address transformation unit 511 embodies functionality to implement embodiments described above. The virtual address transformation unit 511 may include one or more functionalities that facilitate the transformation of virtual addresses based on dynamically configurable page sizes. Any one of these functionalities may be partially (or entirely) implemented in hardware and/or on the processing unit 501. For example, the functionality may be implemented with an application specific integrated circuit, in logic implemented in the processing unit 501, in a coprocessor on a peripheral device or card, etc. Further, realizations may include fewer or additional components not illustrated in FIG. 5 (e.g., video cards, audio cards, additional network interfaces, peripheral devices, etc.). The processor unit 501, the storage device(s) 509, and the network interface 505 are coupled to the bus 503. Although illustrated as being coupled to the bus 503, the memory 507 may be coupled to the processor unit 501.

While the embodiments are described with reference to various implementations and exploitations, it will be understood that these embodiments are illustrative and that the scope of the inventive subject matter is not limited to them. In general, techniques for implementing virtual memory as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the example configurations may be implemented as a combined structure or component. Similarly, structures and functionality presented as a single component may be implemented as separate components. These and other variations, modifications, additions, and improvements may fall within the scope of the inventive subject matter.

What is claimed is:

1. An apparatus comprising:
a processor; and
a virtual address transformation unit coupled with the processor, the virtual address transformation unit including a register, the virtual address transformation unit configured to:
receive an indication of a virtual address;
determine, from the register, a current page size of a plurality of available page sizes;
determine a bit shift amount based, at least in part, on the current page size and a base shift amount, the base shift amount corresponding to a minimum page size; and
perform a bit shift of the virtual address to create a transformed virtual address, wherein the virtual address is bit shifted by, at least, the determined bit shift amount.

2. The apparatus of claim 1, wherein the processor includes the virtual address transformation unit.

3. The apparatus of claim 1, wherein the virtual address transformation unit further includes a shift register, the shift register configured to perform the bit shift.

4. The apparatus of claim 1, wherein the virtual address transformation unit is further configured to determine a current page size shift amount by at least one of:
perform a table lookup on a table, wherein the table maps a value indicating the current page size to the current page size shift amount,
and
determine a number of bits set to one in the value indicating the current page size.

5. The apparatus of claim 1, wherein the virtual address transformation unit is further configured to use the transformed virtual address as at least one of a set of one or more page identifiers and a page offset.

6. The apparatus of claim 5, wherein the virtual address transformation unit is further configured to:
calculate a padding amount for at least one of a page identifier of the set of one or more page identifiers and the page offset; and
pad at least one of the page identifier of the set of one or more page identifiers and the page offset in accordance with the respective calculated padding amount.

7. The apparatus of claim 1, wherein the virtual address transformation unit is further configured to use the transformed virtual address to perform a page table lookup.

8. The apparatus of claim 1, wherein the virtual address is transformed based, at least in part, on a template, wherein the virtual address transformed in accordance with the template is compatible with a plurality of page table types.

9. A computer program product comprising:
a computer readable storage medium having computer usable program code embodied therewith, the computer usable program code comprising a computer usable program code configured to:
receive an indication of a virtual address;
determine, from a register, a current page size of a plurality of available page sizes;
determine a bit shift amount based, at least in part, on the current page size and a base shift amount, the base shift amount corresponding to a minimum page size; and
perform a bit shift of the virtual address to create a transformed virtual address, wherein the virtual address is bit shifted by at least the determined bit shift amount.

10. The computer readable storage medium of claim 9, wherein the computer usable program code further comprises computer usable program code to determine a current page size shift amount by at least one of:
perform a table lookup on a table, wherein the table maps a value indicating the current page size to the current page size shift amount,
and
determine a number of bits set to one in the value indicating the current page size.

11. The computer readable storage medium of claim 9, wherein the computer usable program code is further configured to use the transformed virtual address as at least one of a set of one or more page identifiers and a page offset.

12. The computer readable storage medium of claim 9, wherein the computer usable program code is further configured to use the transformed virtual address to perform a page table lookup.

13. The computer readable storage medium of claim 9, wherein the computer usable program code is further configured to transform the virtual address based, at least in part, on a template, wherein the virtual address transformed in accordance with the template is compatible with a plurality of page table types.

14. The computer readable storage medium of claim 9, wherein the computer usable program code configured to perform the bit shift of the virtual address to create the transformed virtual address includes computer usable program code configured to:
    write the virtual address to a shift register to perform the bit shift, wherein a first register receives a first output of the shift register and a second output of the shift register, the first output comprising a page offset, and the second output comprising a page identifier.

15. The apparatus of claim 1 wherein the virtual address transformation unit is configured is further configured to:
    write the virtual address to a shift register to perform the bit shift, wherein a first register receives a first output of the shift register and a second output of the shift register, the first output comprising a page offset, and the second output comprising a page identifier.

* * * * *